US006933938B1

(12) United States Patent
Matsuda

(10) Patent No.: US 6,933,938 B1
(45) Date of Patent: Aug. 23, 2005

(54) INFORMATION PROCESSING APPARATUS, METHOD AND COMPUTER PROGRAM FOR VIRTUAL REALITY AURA SETTING

(75) Inventor: Satoru Matsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,803

(22) Filed: Sep. 3, 1999

(30) Foreign Application Priority Data

Sep. 30, 1998 (JP) .............................. P10-277064

(51) Int. Cl.7 .......................................... G06T 15/00
(52) U.S. Cl. ...................................................... 345/419
(58) Field of Search ................................ 345/419, 418, 345/633, 706, 758, 422, 473, 474

(56) References Cited

U.S. PATENT DOCUMENTS 5,261,041 A * 11/1993 Susman ....................... 345/473
5,736,982 A *  4/1998 Suzuki et al. ............... 345/706
5,880,731 A *  3/1999 Liles et al. .................. 345/758
5,926,179 A *  7/1999 Matsuda et al. ............. 345/752
6,057,856 A *  5/2000 Miyashita ................... 345/633
6,331,861 B1 * 12/2001 Gerver et al. ............... 345/629
6,405,249 B1 *  6/2002 Matsuda et al. ............. 709/224
6,577,328 B2 *  6/2003 Matsuda et al. ............. 345/757

* cited by examiner

*Primary Examiner*—Shih-Chao Chen
*Assistant Examiner*—Huedung X Cao
(74) *Attorney, Agent, or Firm*—Bell, Boyd & Lloyd LLC

(57) ABSTRACT

According to the present invention, there are provided an information processing apparatus, an information processing method and a computer-readable medium for use with a virtual reality environment. The information processing apparatus includes a sensing-area setting means for setting an area used to sense information on objects, and a transmission-area setting means for setting an area used for transmitting information on an object. The transmission area may be set wider than the sensing area. Thus, according to the present invention, information on an object can be reported to another object located at a remote position with a higher degree of reliability.

16 Claims, 14 Drawing Sheets

F I G. 3
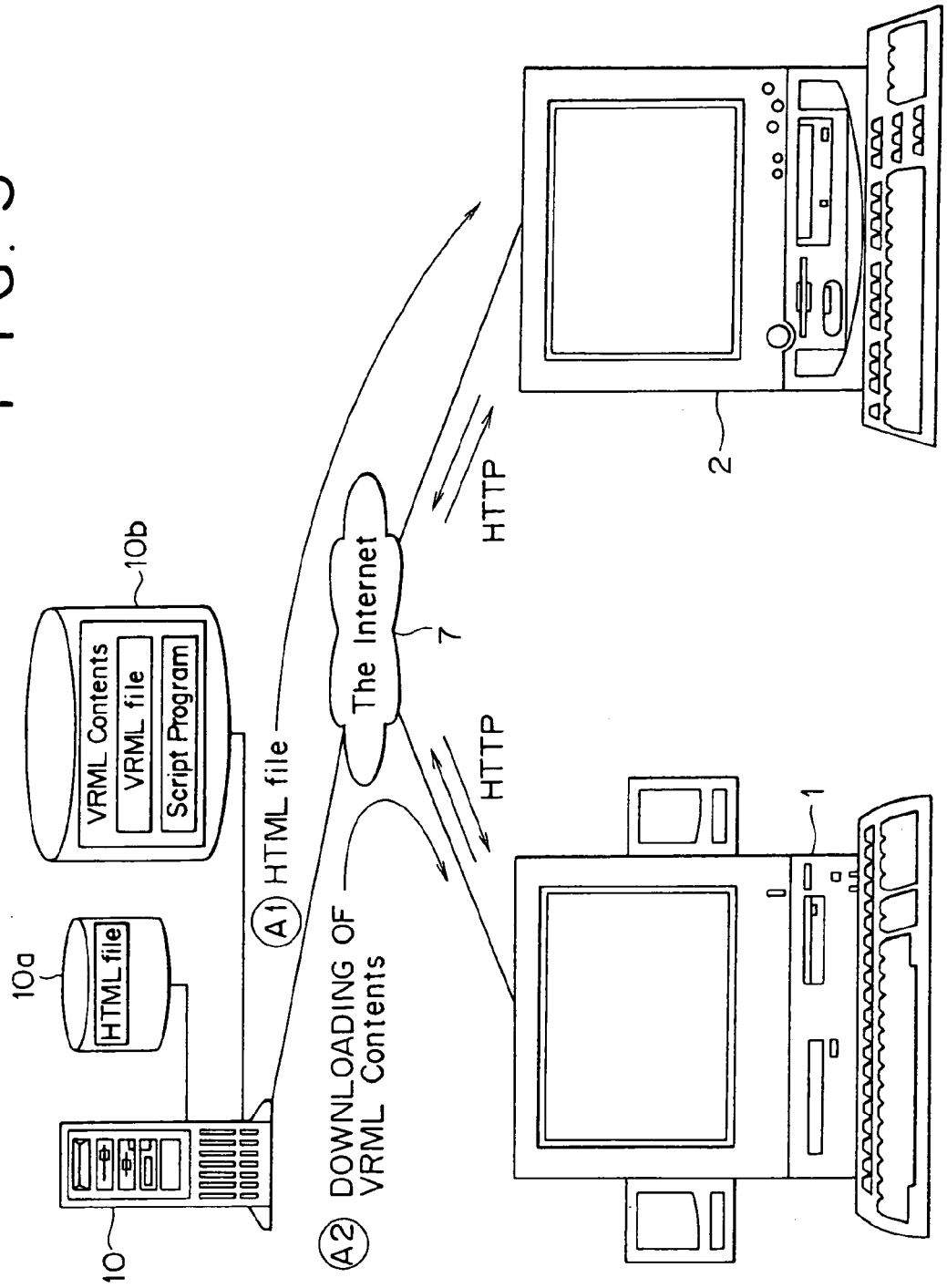

FIG. 10

OBJECT MANAGEMENT INFORMATION
FOR EACH OBJECT

| LIST (SET) A OF PARTNERS EACH SENSING THE OBJECT |
| --- |
| LIST (SET) B OF PARTNERS SENSED BY THE OBJECT |
| TRANSMISSION-AURA VALIDITY FLAG |

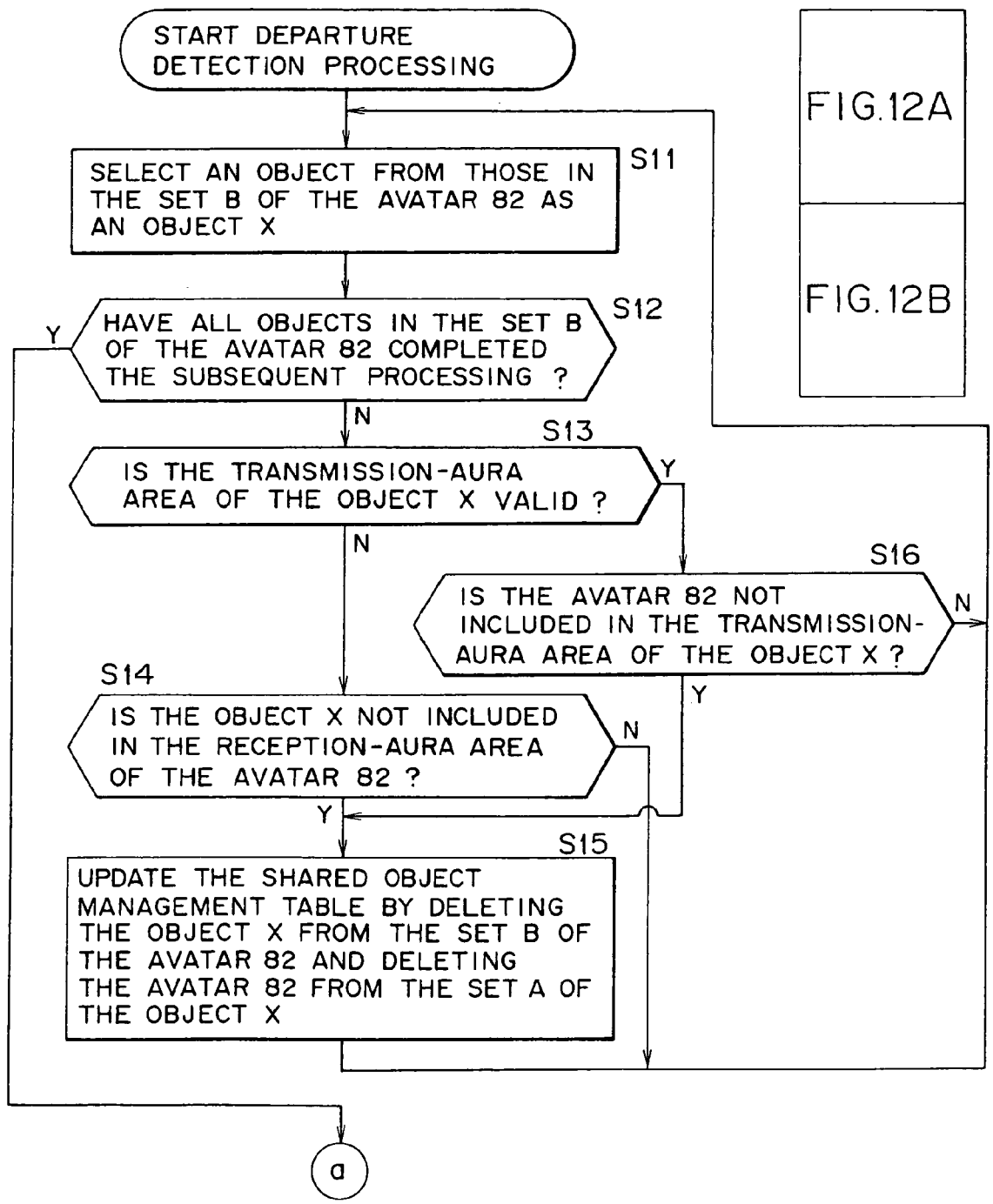

INFORMATION PROCESSING APPARATUS, METHOD AND COMPUTER PROGRAM FOR VIRTUAL REALITY AURA SETTING

CROSS-REFERENCE TO RELATED APPLICATIONS

The present application is related to five other applications commonly assigned and concurrently filed therewith: Application Ser. No. 09/389,812 now U.S. Pat. No. 6,493,001; Application Ser. No. 09/389,801 now U.S. Pat. No. 6,577,306; Application Ser. No. 09/389,773 now U.S. Pat. No. 6,532,007; application Ser. No. 09/390,035 now U.S. Pat. No. 6,734,885; and application Ser. No. 09/340,036, all of which are incorporated herein by reference.

BACKGROUND OF THE INVENTION

In general, the present invention relates to an information processing apparatus, an information processing method and a presentation medium. More particularly, the present invention relates to an information processing apparatus, an information processing method and a presentation medium which allow information on an application object (abbreviated hereafter to an AO) in a 3-dimensional virtual space to be reported to an avatar.

In a 3-dimensional virtual space on the Internet, a plurality of objects are provided with information on a position and a "Dive" system is known as a system which allows the objects to share the information on position. Details of the "Dive" system are described in a reference entitled "DIVE—A Platform for multi-user Virtual Environments" authored by C. Carlsson and O. Hagsand, 18(6) Computers and Graphics, pages 633–669 (1993).

In the "Dive" system, however, the information is shared among all objects existing in the world, so that as the number of objects rises, there is raised a problem of an increased number of messages (an increased amount of information) exchanged among the objects.

In order to solve this problem, an area referred to as an aura is defined for each object. An aura is a spatial area perceivable by an object defined for each object in which the object is capable of sensing other objects. Since only objects placed in the same area share information, the amount of information shared by objects can be suppressed even if the number of objects existing in the world increases. Details of this aura technique are described in a reference entitled "Virtual Society: Extending the WWW to Support a Multi-user Interactive Shared 3D Environment" authored by Yasuaki Honda et al., Proceedings of VRML '95, pages 109 to 116 (ACM Press 1995).

Details of the aura concept are described in a reference entitled "A Spatial Model of Interaction in Large Virtual Environments" authored by S. Benford and L. Fahlen in September 1993, in proceedings of G. DeMichelis et al. (Eds.) presented to a Third European Conference on Computer Supported Cooperative Work, pages 109 to 124 (Kluwer Academic Publishers).

By the way, an AO (application object) also exists in a 3-dimensional virtual space. An AO is a program having a variety of additional functions in the 3-dimensional virtual space. The program is executed on an AO server.

In the technique utilizing the aura as described above, however, when a certain object (including an avatar) wants to sense an AO, such as a clock tower which is far away from the object, there is raised a problem that the object is not capable of sensing the AO if the AO is located outside the aura of the object.

SUMMARY OF THE INVENTION

The present invention allows information of an AO in a 3-dimensional virtual space to be reported to an avatar.

According to one aspect of the present invention, there is provided an information processing apparatus for management of information on objects placed in a 3-dimensional virtual space, the information processing apparatus including: a sensing-area setting means for setting a sensing area used for a sensing object to sense information on one or more sensed objects within the sensing area; and a transmission-area setting means for setting a transmission area used for a transmitting object to transmit information to one or more receiving objects within the transmission area.

According to another aspect of the present invention, there is provided an information processing method for management of information on objects placed in a 3-dimensional virtual space, the information processing method including the steps of: setting a sensing area used for a sensing object to sense information on one or more sensed objects within the sensing area; and setting a transmission area used for a transmitting object to transmit information to one or more receiving objects within the transmission area.

According to a further aspect of the present invention, there is provided a computer-readable medium for presenting a program executable by a computer to operate an information processing apparatus for management of information on objects placed in a 3-dimensional virtual space, the program to carry out processing including the steps of: setting a sensing area used for a sensing object to sense information on one or more sensed objects within the sensing area; and setting a transmission area used for a transmitting object to transmit information to one or more receiving objects within the transmission area.

According to the present invention, the transmission area may be set wider than the sensing area. This allows information on an object to be reported to another object located at a remote position with a higher degree of reliability.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIG. 3 is an explanatory diagram used for describing the operation of the system shown in FIG. 1;

FIG. 10 is an explanatory diagram used for describing management information of objects held in a shared server employed in the system shown in FIG. 1;

FIGS. 12A–12B show flowcharts representing departure detection processing carried out at a step S1 of the flowchart shown in FIG. 11.

DETAILED DESCRIPTION OF THE PREFERRED EMBODIMENTS

Figure 1:
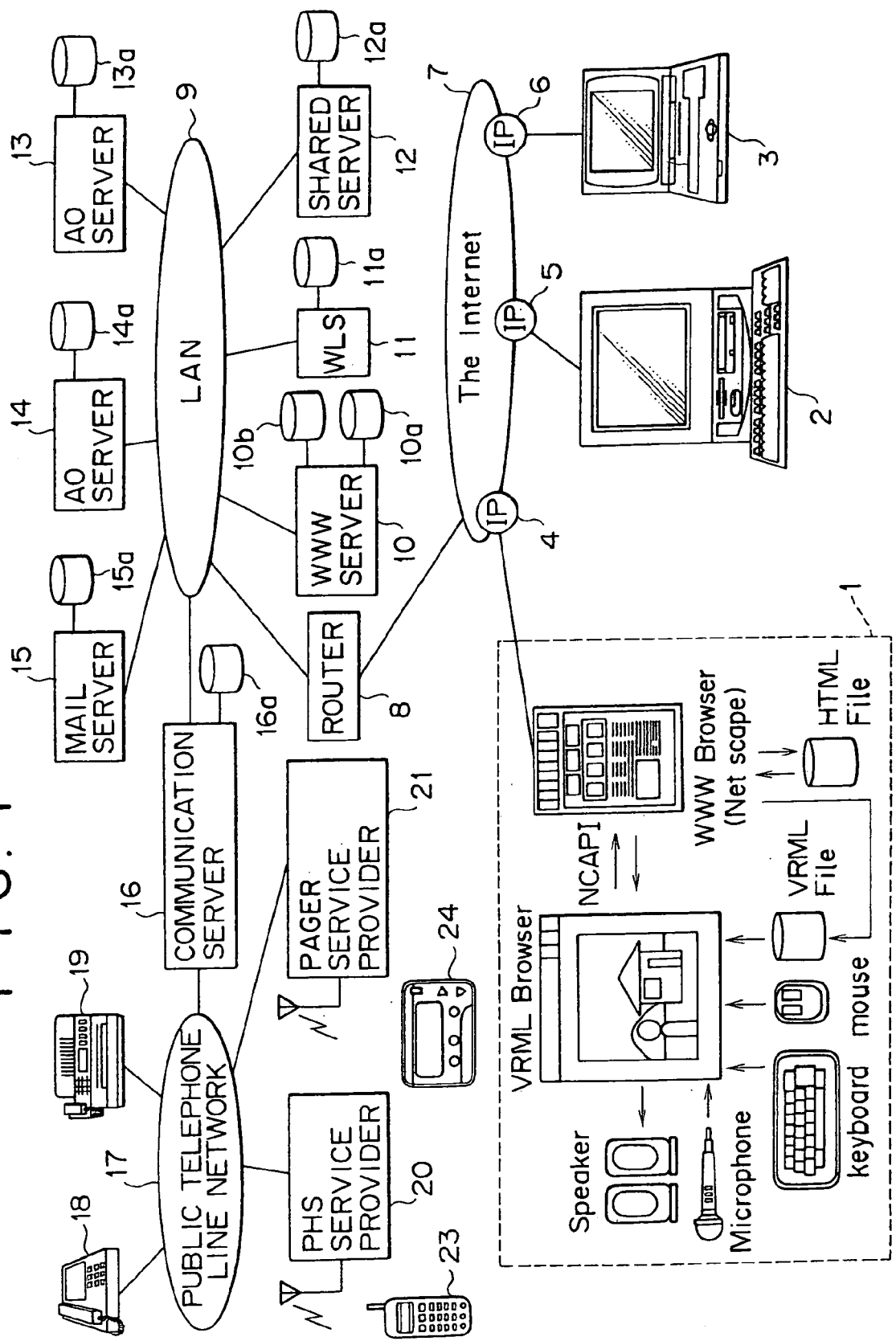
FIG. 1 is a block diagram showing a typical configuration of a system presenting a shared virtual space to which the present invention is applied.

FIG. 1 is a block diagram showing a typical configuration of a system presenting a shared virtual space to which the present invention is applied. It should be noted that the system cited in this specification means an entity obtained as a result of logically putting a plurality of apparatuses in a set without regard to whether or not the apparatuses are physically accommodated in a box.

As shown in FIG. 1, client PCs (personal computers) 1 to 3 are connected to the Internet 7 through IPs (Internet connection service providers) 4 to 6 respectively. In each of the client PCs 1 to 3, a VRML browser and a WWW browser are installed and ready to be operated.

The client PCs 1 to 3 each have two functions, namely, a 3D client function and a 2D client function. The function for a 3D client is used to notify a shared server 12 periodically or if necessary of data such as information on the location of the client PC, to receive information shared by other 3D objects from the shared server 12 supplied thereto, and to display the information. On the other hand, the function for a 2D client is executed to transmit a request for information to a WWW server 10 in accordance with an HTTP, to receive a response to the request from the WWW server 10 and to display mainly 2-dimensional information. When a URL is included in information received from the shared server 12, the 3D-client issues a request for an access to the URL to the 2D-client. At this request, the 2D-client makes an access to the URL (in actuality to the WWW server 10) to download data such as the shape of an object and forward the data to the 3D-client.

A LAN (Local Area Network) 9 is connected to the Internet 7 through a router 8. Connected to the LAN 9 are the WWW server 10, a WLS (World Location Server) 11, the shared server 12, AO (Application Object) servers 13 and 14, a mail server 15 and a communication server 16. The WWW server 10 has hard discs (HDDs) 10a and 10b whereas the other servers 11 to 16 have HDDs 11a to 16a, respectively.

It should be noted that the AO server 13 has a program for communicating with the shared server 12 to present for example an application object (AO) such as a robot or an electronic pet which moves autonomously in a virtual space. Much like the 3D-client function, the AO server 13 communicates with the shared server 12 to report information on itself and to receive information shared by other 3D objects.

The communication server 16 is connected to a telephone 18 or a facsimile 19 through a public telephone line network 17, and is radio-connected to a PHS (Personal Handyphone System) terminal 23 through a PHS service provider 20 and to a pocket-bell terminal 24 through a pager service provider 21.

Figure 2:
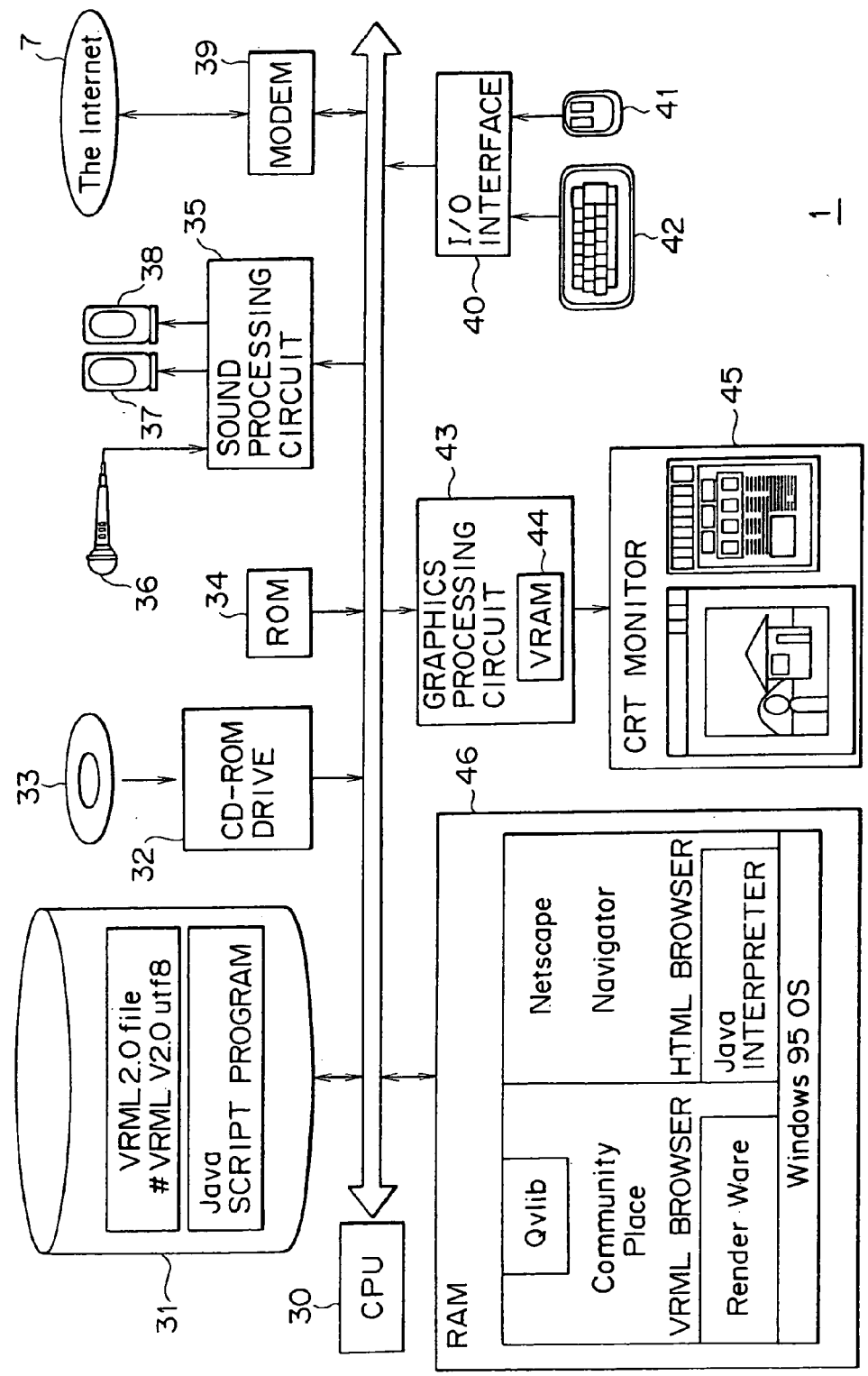
FIG. 2 is a block diagram showing a typical configuration of a client PC employed in the system shown in FIG. 1.

FIG. 2 is a block diagram showing a typical configuration of hardware of the client PC 1. In this configuration, a CPU 30 carries out various kinds of processing by executing a program stored in a ROM 34. A HDD 31 is used for storing, among other information, VRML contents such as VRML2.0 files and predetermined script programs written in the Java (a trademark of Sun Microsystems, USA). A CD-ROM drive 32 reads out VRML contents stored in a CD-ROM disc 33.

Connected to a microphone 36 as well as right and left speakers 37 and 38, a sound processing circuit 35 inputs a sound from the microphone 36 or outputs sounds such as music and sound effects to the speakers 37 and 38. A modem 39 (or other interface device) connected to the Internet 7 is used for exchanging data with the Internet 7. An I/O (input/output) interface 40 receives operation signals from a mouse 41 and a keyboard 42. A graphics circuit 43 includes an embedded VRAM 44 for storing picture data completing various kinds of processing. The graphics circuit 43 reads out data from the VRAM 44, outputting the data to a CRT monitor 45.

A WWW browser such as Netscape Navigator, a Java interpreter and the Community Place Browser are loaded into a RAM 46 to be executed by the CPU 30. Netscape Navigator is a WWW browser running under the Windows 95 (a trademark of Microsoft Corp.) and the Community Place Browser is a VRML2.0 browser developed by Sony Corporation, the assignee of the present application.

The VRML2.0 browser implements QvLib (which is a library [or a parser] for interpreting the VRML syntax developed and gratuitously released by Silicon Graphics, Inc.) and RenderWare (which is a software renderer developed by Criterion Software Ltd., UK) or a parser and a renderer having capabilities equivalent to those of QvLib and RenderWare respectively.

As shown in FIG. 1, the Community Place Browser exchanges various kinds of data with the Netscape Navigator serving as a WWW browser in accordance with a NCAPI (Netscape Client Application Programming Interface, a trademark).

The Netscape Navigator browser receives an HTML file and VRML contents (including a VRML file and a script program written in the Java language) transmitted by the WWW server 10 by way of the Internet 7, storing the HTML file and the VRML contents in the local HDD 31. The Netscape Navigator browser processes the HTML file, displaying a text and a picture obtained as a result of the processing on a CRT monitor 45. On the other hand, the Community Place Browser processes the VRML file to display a 3-dimensional virtual space on the CRT monitor 45 and changes behaviors of objects in the 3-dimensional virtual space and other display states in accordance with a result of execution of the script program by the Java interpreter.

It should be noted that the other client PC 2 and PC 3 each have the same configuration as the client PC 1 even though the configurations of the PC 2 and PC 3 are not shown explicitly in the figure.

Next, the operation of the embodiment described above is explained by referring to FIGS. 3 to 5. In the state shown in FIG. 3, first of all, a homepage on a web site providing VRML contents is browsed by using the WWW browser as shown by reference number A1. In this example, the homepage is accessed at <http://pc.sony.co.jp/sapari/>. Then, the user of the client PC 1 or PC 2 downloads VRML contents including a VRML2.0 file and a script program written in the Java language to enable autonomous motions in a VRML space as shown by reference number A2.

It is needless to say that VRML contents can also be obtained by letting the CD-ROM drive 32 read out the contents from the CD-ROM disc 33.

Figure 4:
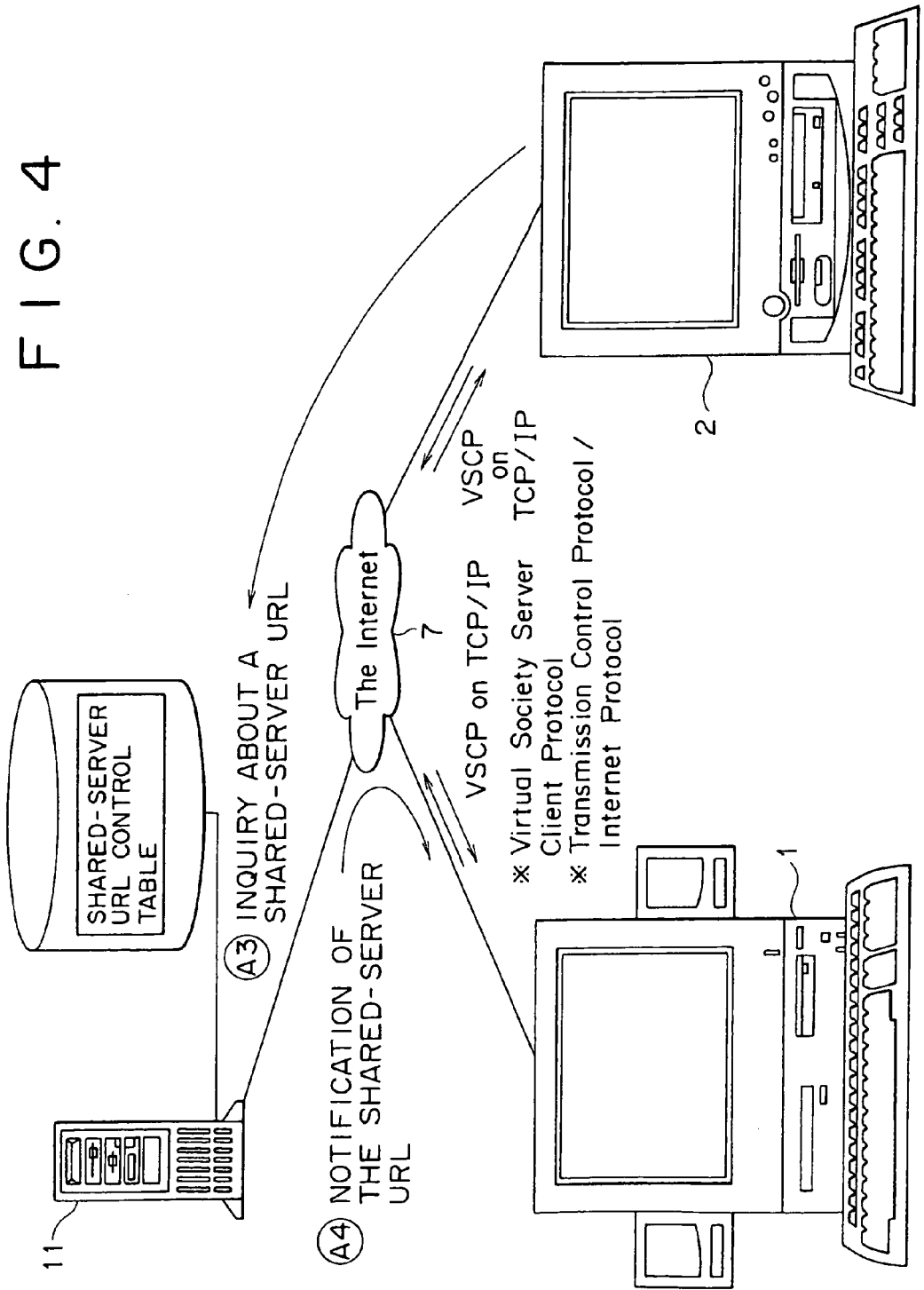
FIG. 4 is an explanatory diagram used for describing the operation of the system shown in FIG. 1.

Then, the Community Place Browser serving as a VRML2.0 browser in the client PC 1 or PC 2 interprets and executes the VRML2.0 file downloaded and temporarily stored in the local HDD 31 as shown in FIG. 4 and, as indicated by reference number A3, an inquiry about the URL of the shared server 12 is transmitted to the WLS 11 in accordance with a VSCP (Virtual Society Server Client Protocol). Upon receiving the inquiry, the WLS 11 searches a shared server URL management table stored in the HDD 11a for the URL inquired and transmits the URL of the shared sever 12 to the client PC 1 or 2 in response to the inquiry as indicated by reference number A4.

Figure 5:
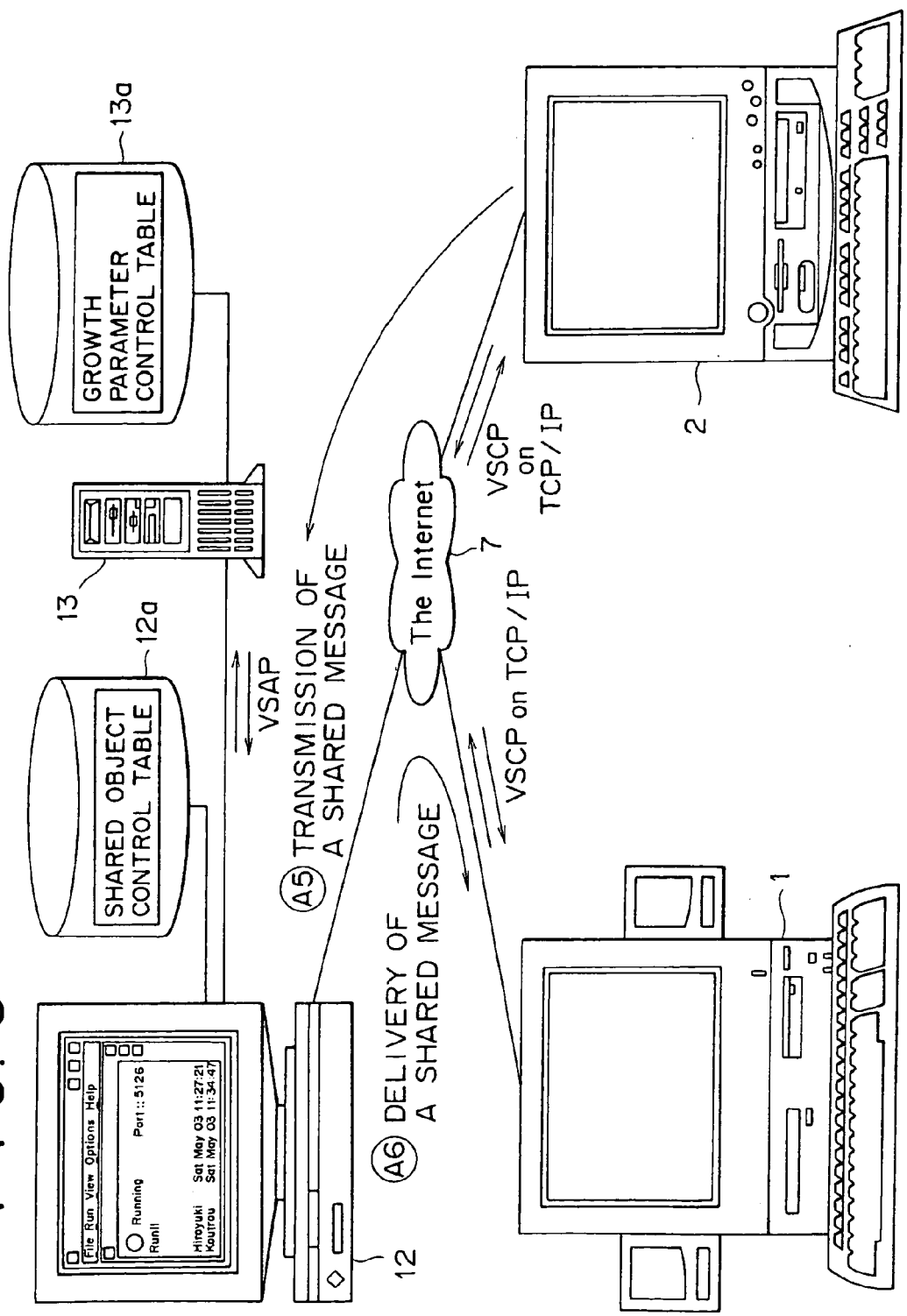
FIG. 5 is an explanatory diagram used for describing the operation of the system shown in FIG. 1.

The URL thus found is used to connect the client PC 1 and 2 to the shared server 12 as shown in FIG. 5. As a result, a shared message on attributes of a shared 3D object such as the position and the motion thereof is transmitted by way of the shared server 12 as indicated by reference number A5 and the shared message is forwarded to other client PC as indicated by reference number A6. In this way, a multi-user environment is implemented. For a detailed description of the above connection procedure, refer to U.S. patent application Ser. No. 08/678,340.

While the 3-dimensional virtual space is used under a multi-user environment in this case, the 3-dimensional virtual space may be used under an environment other than a multi-user environment as well. That is to say, the 3-dimensional virtual space may be used under an environment which is referred to hereafter as a single-user environment for the sake of convenience. In a single-user environment, the avatar of another user is not allowed to appear in the 3-dimensional virtual space and the avatar of the user herself/himself is not allowed to appear in the 3-dimensional virtual space of the client PC of a user other than this particular user initiating the pieces of processing indicated by reference numbers A1 and A2. For the sake of convenience, the avatar of another user and the avatar of the particular user are referred to as a drawn avatar and a pilot avatar respectively. In order to establish a single-user environment, it is not necessary to carry out the pieces of processing indicated by reference numbers A3 to A6.

Figure 6:
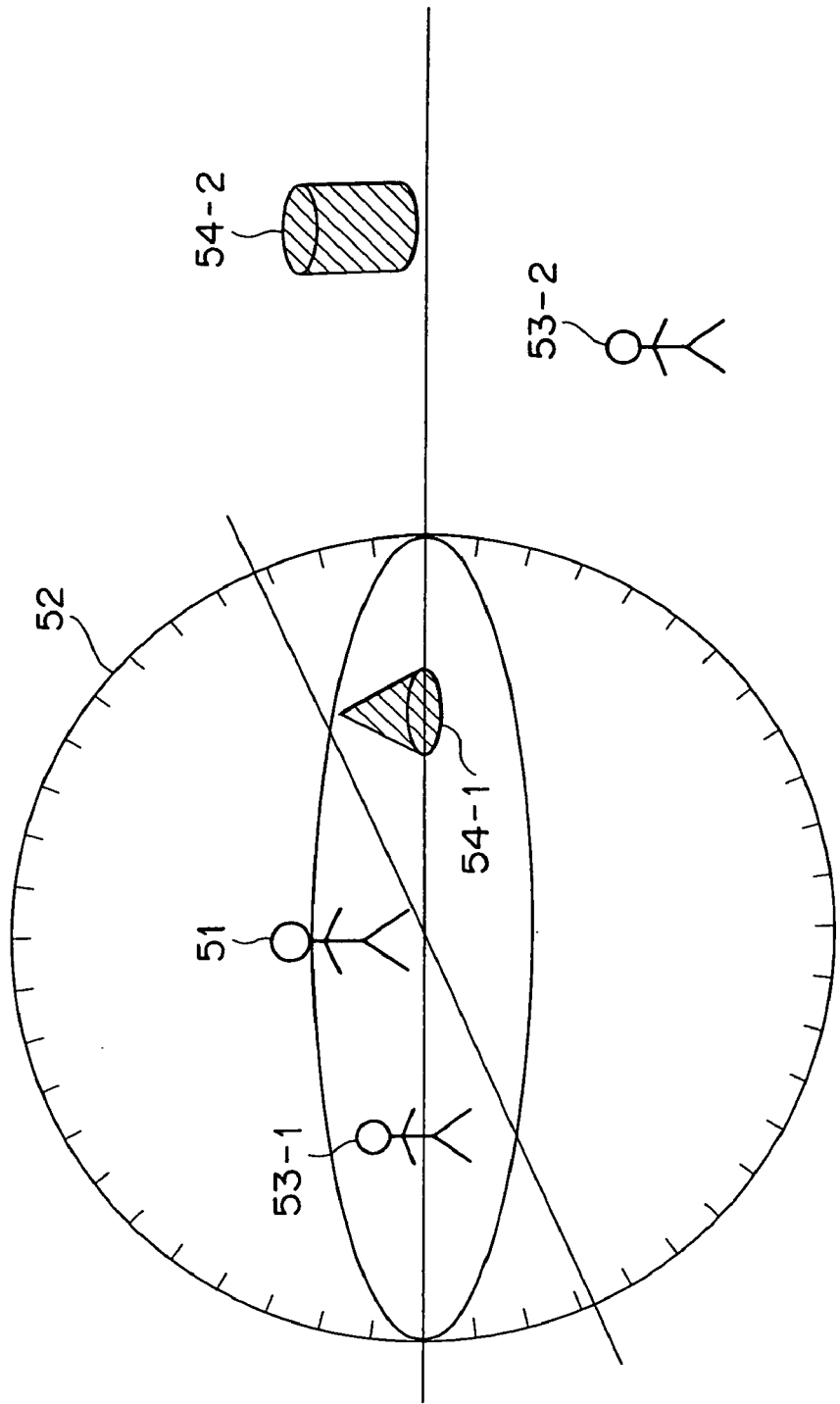
FIG. 6 is an explanatory diagram used for describing an aura.

Next, an aura is explained by referring to FIG. 6. As shown in the figure, an aura 52 with a spherical shape having a predetermined radius is formed around a pilot avatar 51 with the center of the sphere coinciding with pilot avatar 51. The pilot avatar 51 is capable of receiving information from another object located inside the aura 52. That is to say, the pilot avatar 51 is capable of visually recognizing a drawn avatar 53-1 and an application object (AO) 54-1 which are located inside the aura 52. To put it concretely, the pictures of the drawn avatar 53-1 and the object 54-1 are displayed on the CRT monitor of the client PC of the pilot avatar 51. However, the pilot avatar 51 is capable of visually recognizing neither a drawn avatar 53-2 nor an application object (AO) 54-2 which are located outside the aura 52. To put it concretely, the pictures of the drawn avatar 53-2 and the object 54-2 are not displayed on the CRT monitor of the client PC of the pilot avatar 51.

By the same token, an aura is also set for each of the other objects, namely, the drawn avatar 53-1 and the object 54-1, the drawn avatar 53-2 and the object 54-2. In this system, the size of each aura is uniform for all client PCs. It should be noted, however, that the aura of an AO can be set with a size different from the aura of the avatar if necessary. Furthermore, the use of a spherical aura is merely for convenience and an irregularly-shaped aura may be used if so desired.

With the aura 52 prescribed as described above, it becomes necessary for the pilot avatar 51 to acquire information from the drawn avatar 53-1 and the object 54-1 but not from the drawn avatar 53-2 and the object 54-2 which are located outside the aura 52. The amount of information to be received can thus be reduced.

Figure 7:
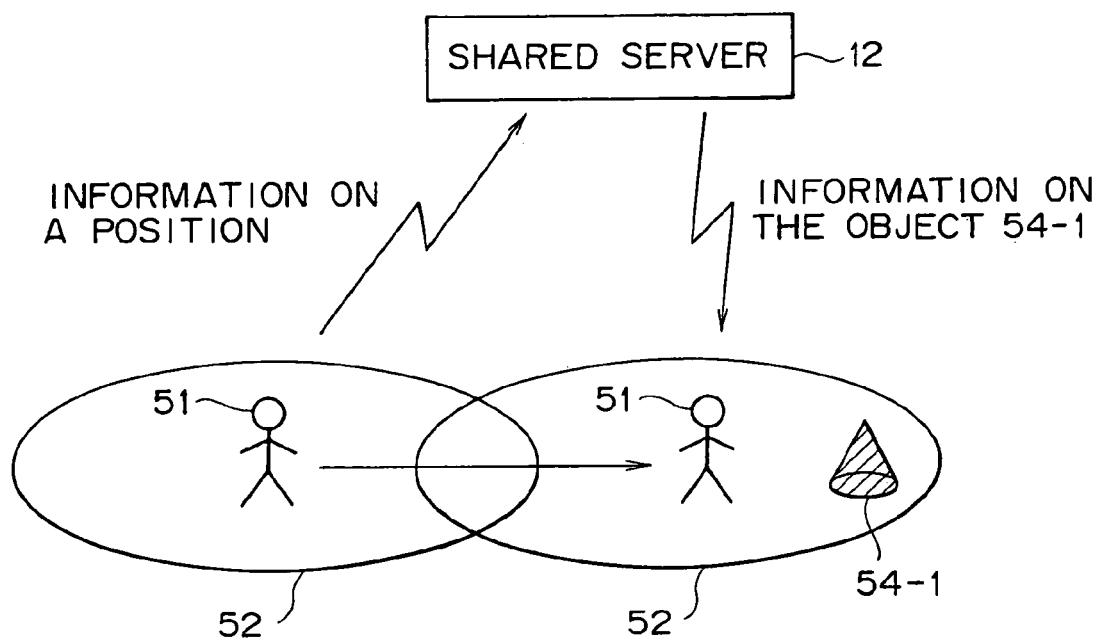
FIG. 7 is an explanatory diagram used for describing sensing of an object accompanying a movement of an avatar.

Consider an example shown in FIG. 7. When the avatar 51 moves, information on its new position is transmitted to the shared server 12. Upon receiving the information on the new position of the avatar 51, the shared server 12 identifies what objects (including avatars) are located inside the aura 52 centered at the new position of the avatar 51 and transmits information on the objects to the client PC of the avatar 51. In the example shown in FIG. 7, since an object 54-1 is identified as an object located inside the aura 52 centered at the new position of the avatar 51 after its movement, the shared server 12 transmits information on the object 54-1 to the client PC of the avatar 51. Upon receiving the information on the object 54-1, the client PC of the avatar 51 displays the picture of the object 54-1, allowing the user of the avatar 51 to visually recognize the object 54-1.

If a large number of objects exist in the world (the virtual space), there may also be many objects located inside the aura 52, increasing the amount of information to be received. In order to prevent the amount of information to be received from exceeding what is really required, a maximum number of objects in an aura that can be visually recognized by the avatar of the aura is set in advance to be controlled by the shared server 12. As a result, only information on a number of objects not exceeding the selected maximum is transmitted. For example, assume that the maximum number of objects in the aura 52 that can be visually recognized by the avatar 51 is set at two and there are three or more objects located inside the aura 52. In this case, only two objects that are included first or at earliest times are taken into account. That is to say, information on the third and subsequent objects entered the aura 52 after the second one are not reported to the avatar 51. The maximum number of objects in the aura 52 that can be visually recognized by the avatar 51 is set in advance at a value predetermined by, among other limiting factors, a restriction on resources in the client PC for the avatar 51 and a limit on a transmission bandwidth of a network between the client PC and the shared server 12.

It should be noted, however, that the maximum number of objects in the aura 52 that can be visually recognized by the avatar 51 may exclude AOs (application objects) moving autonomously in the world. Thus, the avatar 51 is always capable of visually recognizing such an AO, even if the number of objects included in the aura 52 has already reached the maximum.

By the way, if a maximum limit value is imposed on the number of objects in an aura that can be visually recognized by the avatar of the aura as described above, it will be quite within the bounds of possibility that imposition of such a limit results in a state of mismatching, that is a state in which the avatar of the aura is not capable of visually recognizing another avatar in spite of the fact that the other avatar is capable of visually recognizing the avatar of the aura.

Figure 8:
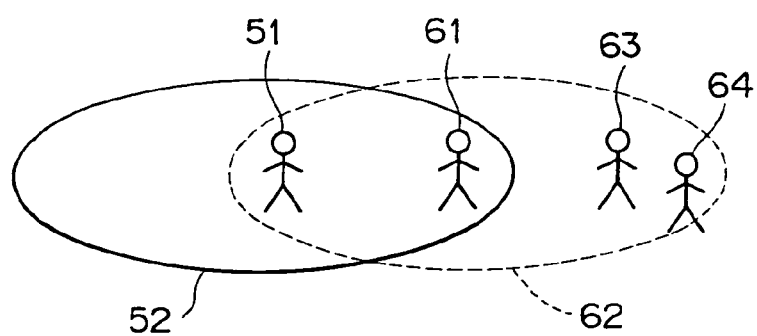
FIG. 8 is an explanatory diagram used for describing mismatching in sensing of avatars.

The state of mismatching cited above is exemplified by the following case. Assume that an avatar 51 enters an aura 62 of an avatar 61 after avatars 63 and 64 have already been included in the aura 62 as shown in FIG. 8. In this case, the avatar 51 visually recognizes the avatar 61 due to the fact that the avatar 61 is the only avatar in an aura 52 of the avatar 51. On the other hand, the avatar 61 is not capable of visually recognizing the avatar 51 due to the fact that, when the avatar 51 enters the aura 62, the maximum number of avatars that can be recognized by the avatar 61 in the aura 62 has been reached by the existence of the two other avatars 63 and 64 in the aura 62. Thus, when the third avatar 51 newly enters the aura 62, the avatar count exceeds the maximum number 2, making the avatar 61 incapable of visually recognizing the third avatar 51. As a result, the avatar 61 is not capable of visually recognizing the other avatar 51, in spite of the fact that the other avatar 51 is capable of visually recognizing the avatar 61. Thus, for example, the avatar 51 is capable of requesting the avatar 61 to have a chat with the avatar 61, but the avatar 61 is not capable of accepting the request for the chat made by the avatar 51.

In order to avoid such a state of mismatching, the system is designed, so that, if the avatar 51 is capable of visually recognizing the avatar 61, the avatar 61 is also made capable of visually recognizing the newly entering avatar 51, even in a state in which the presence of the avatar 51 causes the avatar count in the aura 62 to exceed the maximum value thereof. It is thus possible to avoid a state of mismatching in which a specific avatar in an aura is not capable of visually recognizing another avatar in the aura in spite of the fact that the other avatar is capable of visually recognizing the specific avatar.

Figure 9A:
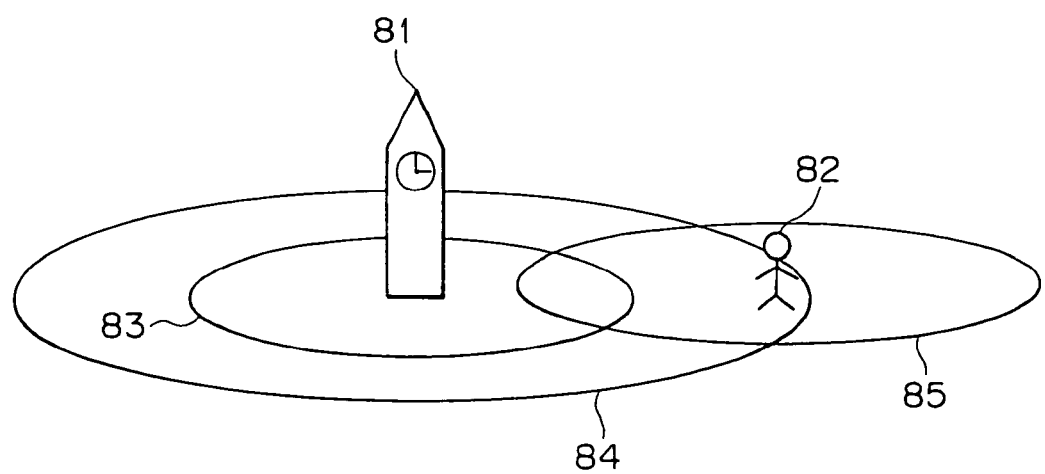
FIGS. 9A–9B are explanatory diagrams used for describing a transmission aura and a reception aura of an AO.

So far, a reception aura of an avatar has been mainly explained. Next, a transmission aura of an AO provided by the present invention is described by referring to FIG. 9A. In this system, while only a reception aura is set for an avatar, reception and transmission auras are set for an AO. As shown in FIG. 9A, a reception aura 83 and a transmission aura 84 having a radius larger than that of the reception aura 83 are set for an AO 81. The transmission aura 84 is capable of informing an avatar existing at a farther location of information on the AO 81. (Note that transmission may also occur within the reception aura 83.) A reception aura 85 of an avatar 82 has a radius equal to the reception aura 83. If desired, the reception aura 85 may have a radius different from that of the reception aura 83. Without setting the transmission aura 84, that is, with only the reception aura 83 set for the AO 81, the avatar 82 will not be capable of sensing the AO 81, which is a clock tower in this example, since the AO 81 is located outside the reception aura 85 of the avatar 82. By setting also the transmission aura 84 having a radius greater than that of the reception aura 83, however, it is more positively within the bounds of possibility that the avatar 82 is located inside the transmission aura 84, even if the avatar 82 is far away from the AO 81, so that the avatar 82 is capable of sensing the AO 81.

Figure 9B:
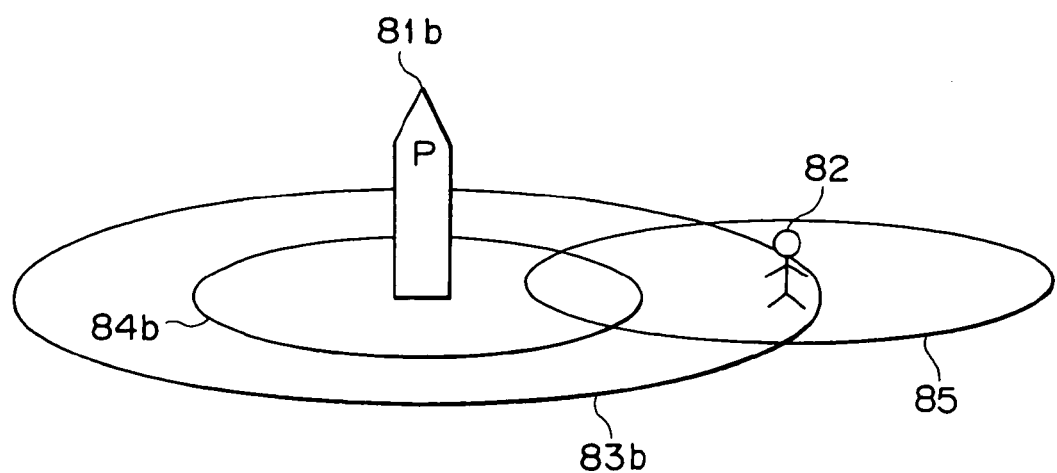

FIG. 9B shows details similar to that of FIG. 9A, with the reception aura 83b wider than the transmission aura 84b. Such a configuration is useful when the AO 81b is desired to receive information from the avatar 82 from a greater distance than the AO 81b is desired to transmit information. As an example, the AO 81b may be a VR police station that is able to receive information from avatars at a wide distance throughout the VR world.

Figure 11:
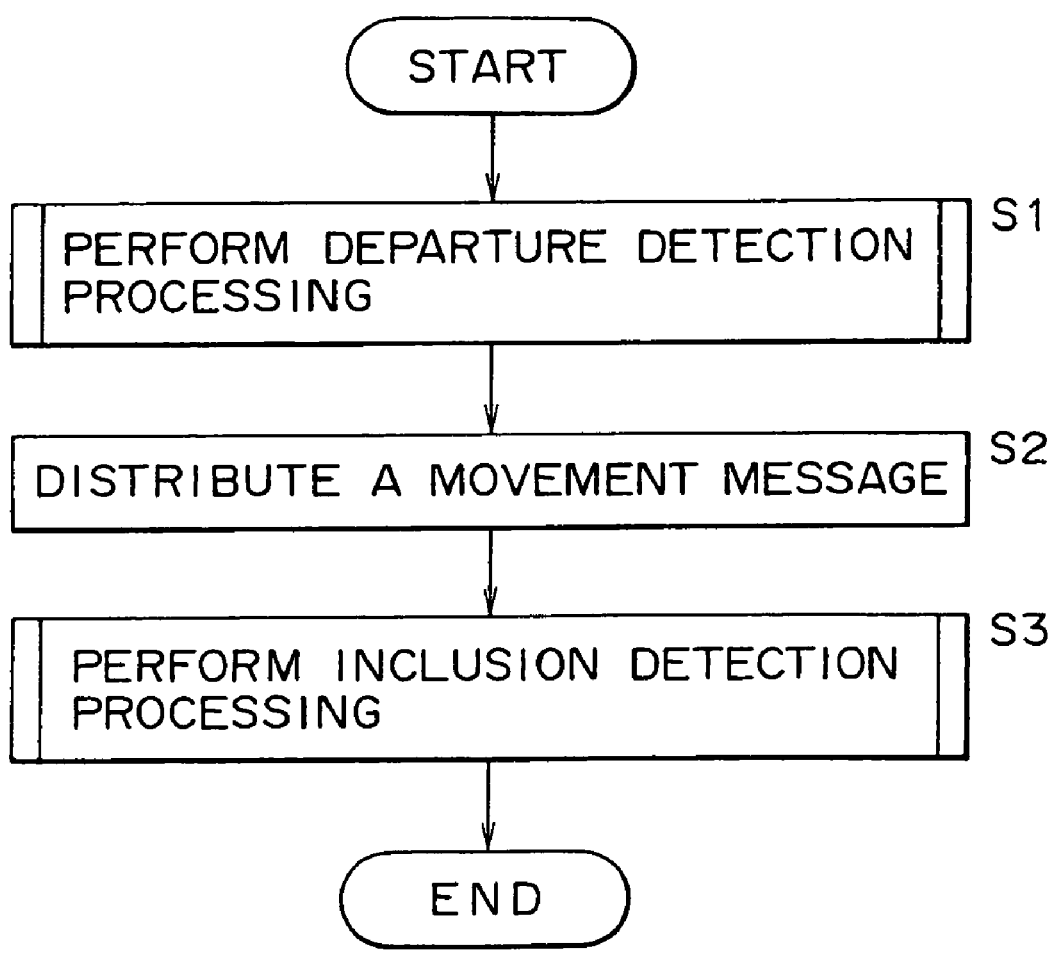
FIG. 11 shows a flowchart representing movement notification processing.

FIG. 11 shows a flowchart representing movement notification processing which is carried out by the shared server 12 when the shared server 12 is informed of a movement of the avatar 82 in the virtual space shown in FIG. 9A. (Similar steps are undertaken with regard to the virtual space shown in FIG. 9B.) It should be noted that the shared server 12 has information listed in a table shown in FIG. 10 for each object Z, namely a shared object management table. In the shared object management table shown in FIG. 10, a list (set) A is a set of other objects aware of the object Z. A list (set) B is a set of other objects known by the object Z. A transmission-aura validity flag indicates whether the transmission aura of the object Z is valid or invalid.

As shown in FIG. 11, the flowchart begins with a step S1 in which the shared server 12 carries out departure detection processing when the avatar 82 moves. In the processing, the shared server 12 forms a judgment as to whether or not another object such as the AO 81 is no longer sensed by the avatar 82, that is, whether or not the other object is no longer included in the reception aura 85 of the avatar 82 due to the movement of the avatar 82. In the processing, the shared server 12 also forms a judgment as to whether or not the movement of the avatar 82 causes the avatar 82 to depart from the auras of other objects including the AO 81.

The flow of the processing then goes on to a step S2 in which the shared server 12 transmits a message on the movement of the avatar 82 to other objects in the world. This message may include information on the AO 81 to other VR objects within the transmission aura 84. The message may also include information to the avatar 82 on other VR objects within the reception aura 85.

The flow of the processing then goes on to a step S3 in which the shared server 12 carries out inclusion detection processing. In the processing, the shared server 12 forms a judgment as to whether or not another object gets newly included in the reception aura 85 of the avatar 82 due to the movement of the avatar 82. In the processing, the shared server 12 also forms a judgment as to whether or not the avatar 82 enters the auras of other objects such as the AO 81 due to the movement of the avatar 82.

Figure 12B:
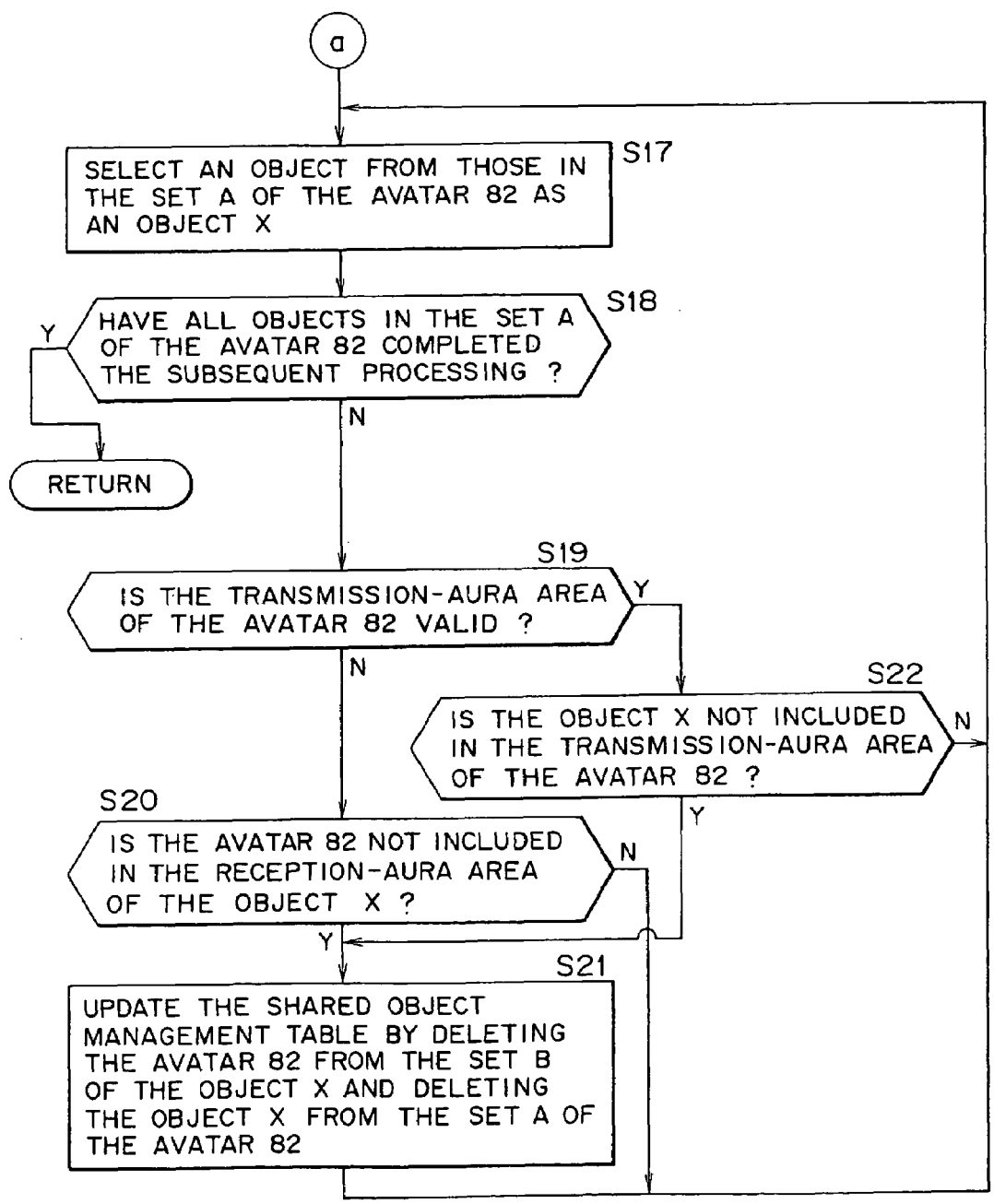

The formation of the judgment at the step S1 is explained by referring to flowcharts shown in FIGS. 12A–12B as follows.

As shown in FIG. 12A, the flowchart begins with a step S11 in which the shared server 12 selects an object from those in the set B of the avatar 82 as an object X.

The flow of the processing then goes on to a step S12 in which the shared server 12 forms a judgment as to whether or not all objects in the set B of the avatar 82 have completed the subsequent processing following step S12. If the outcome of the judgment formed at the step S12 indicates that all objects in the set B of the avatar 82 have not yet completed the subsequent processing, the flow of the processing goes on to a step S13.

At the step S13, the shared server 12 forms a judgment as to whether the transmission-aura area of the object X is valid or invalid. If the outcome of the judgment formed at the step S13 indicates that the transmission-aura area of the object X is invalid, the flow of the processing goes on to a step S14.

At the step S14, the shared server 12 forms a judgment as to whether or not the object X is still included in the reception-aura area of the avatar 82 after the movement of the avatar 82. If the outcome of the judgment formed at the step S14 indicates that the object X is no longer included in the reception-aura area of the avatar 82, the flow of the processing goes on to a step S15.

At the step S15, the shared server 12 deletes the object X from the set B of the avatar 82 and deletes the avatar 82 from the set A of the object X since the object X is no longer in the reception-aura area of the avatar 82. That is to say, the shared sever 12 updates the shared object management tables (see FIG. 10) of the avatar 82 and the object X. After the shared object management tables have been updated at the step S15, the flow of the processing goes back to the step S11 to repeat the processing described so far.

It should be noted that, if the outcome of the judgment formed at the step S14 indicates that the object X is still included in the reception-aura area of the avatar 82, on the other hand, it is not necessary to delete the object X from the set B of the avatar 82 nor the avatar 82 from the set A of the object X. In this case, the flow of the processing goes back to the step S11, skipping the processing of the step S15.

If the outcome of the judgment formed at the step S13 indicates that the transmission-aura area of the object X is valid, on the other hand, the flow of the processing goes on to a step S16. At the step S16, the shared server 12 forms a judgment as to whether or not the avatar 82 is still included in the transmission-aura area of the object X after the movement of the avatar 82. If the outcome of the judgment formed at the step S16 indicates that the avatar 82 is no longer included in the transmission-aura area of the object X, the flow of the processing goes on to the step S15 in which the shared sever 12 updates the shared object management tables as described above. After the shared object management tables have been updated at the step S15, the flow of the processing goes back to the step S11 to repeat the processing described so far. It should be noted that, if the outcome of the judgment formed at the step S16 indicates that the avatar 82 is still included in the transmission-aura area of the object X, on the other hand, it is not necessary to update the shared object management tables. In this case, the flow of the processing goes back to the step S11, skipping the processing of the step S15.

Thereafter, the pieces of processing of the steps S11 to S16 are carried out repeatedly as long as the outcome of the judgment formed at the step S12 indicates that all the objects in the set B of the avatar 82 have not yet been selected. When all objects in the set B of the avatar 82 have been selected, the flow of the processing goes on to a step S17. At the step S17, the shared server 12 selects an object from those in the set A of the avatar 82 as an object X. The flow of the processing then goes on to a step S18.

At the step S18, the shared server 12 forms a judgment as to whether or not all objects in the set A of the avatar 82 have completed the processing steps following step S18. If the outcome of the judgment formed at the step S18 indicates that all objects in the set A of the avatar 82 have not yet completed the subsequent processing, the flow of the processing goes on to a step S19.

At the step S119, the shared server 12 forms a judgment as to whether the transmission-aura area of the avatar 82 is valid or invalid. If the outcome of the judgment formed at the step S19 indicates that the transmission-aura area of the object X is invalid, the flow of the processing goes on to a step S20.

At the step S20, the shared server 12 forms a judgment as to whether or not the avatar 82 is still included in the reception-aura area of the object X after the movement of the avatar 82. If the outcome of the judgment formed at the step S20 indicates that the avatar 82 is no longer included in the reception-aura area of the object X, the flow of the processing goes on to a step S21.

At the step S21, the shared server 12 deletes the avatar 82 from the set B of the object X and deletes the object X from the set A of the avatar 82 since the avatar 82 is no longer in the reception-aura area of the object X. That is to say, the shared sever 12 updates the shared object management tables (see FIG. 10) for the object X and the avatar 82. After the shared object management tables have been updated at the step S21, the flow of the processing goes back to the step S17 to repeat the processing described so far.

It should be noted that, if the outcome of the judgment formed at the step S20 indicates that the avatar 82 is still included in the reception-aura area of the object X, on the other hand, it is not necessary to delete the avatar 82 from the set B of the object X and delete the object X from the set A of the avatar 82. In this case, the flow of the processing goes back to the step S17, skipping the processing of the step S21.

If the outcome of the judgment formed at the step S19 indicates that the transmission-aura area of the avatar 82 is valid, on the other hand, the flow of the processing goes on to a step S22. At the step S22, the shared server 12 forms a judgment as to whether or not the object X is still included in the transmission-aura area of the avatar 82 after the movement of the avatar 82. If the outcome of the judgment formed at the step S22 indicates that the object X is not included in the transmission-aura area of the avatar 82 anymore, the flow of the processing goes on to the step S21 in which the shared sever 12 updates the shared object management tables as described above. After the shared object management tables have been updated at the step S21, the flow of the processing goes back to the step S17 to repeat the processing described so far. It should be noted that, if the outcome of the judgment formed at the step S22 indicates that the object X is still included in the transmission-aura area of the avatar 82, on the other hand, it is not necessary to update the shared object management tables. In this case, the flow of the processing goes back to the step S17, skipping the processing of the step S21.

Thereafter, the pieces of processing of the steps S17 to S22 are carried out repeatedly as long as the outcome of the judgment formed at the step S18 indicates that objects in the set A of the avatar 82 have not yet all completed the subsequent processing. When all objects in the set A of the avatar 82 have completed the subsequent processing, the flow of departure detection processing is terminated and the flow of processing goes back to the step S2 of the flowchart shown in FIG. 11.

Next, the inclusion detection processing is explained by referring to flowcharts shown in FIGS. 13A–13B as follows.

Figure 13A:
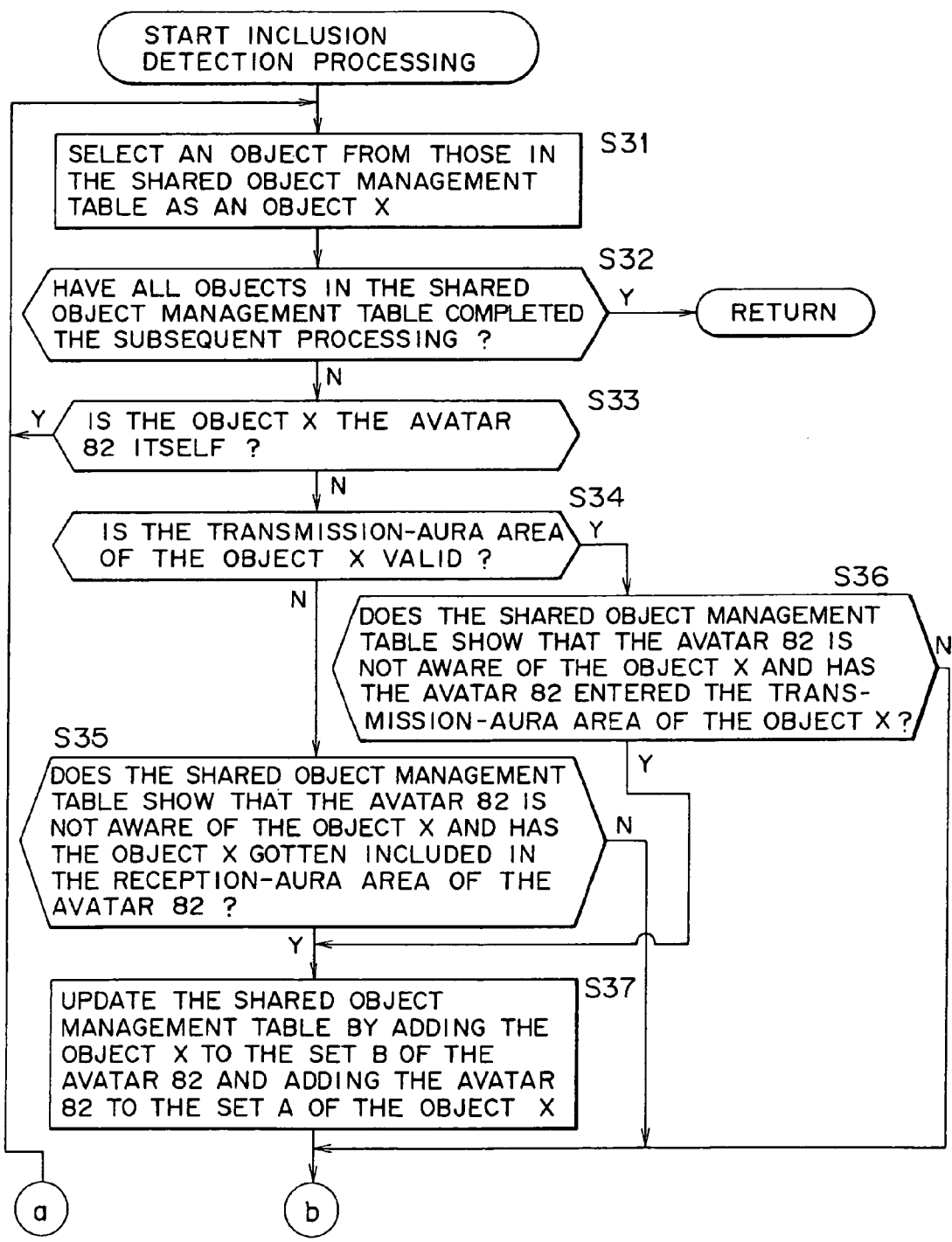
FIGS. 13A–13B show flowcharts representing inclusion detection processing carried out at a step S3 of the flowchart shown in FIG. 11.
Figure 13B:
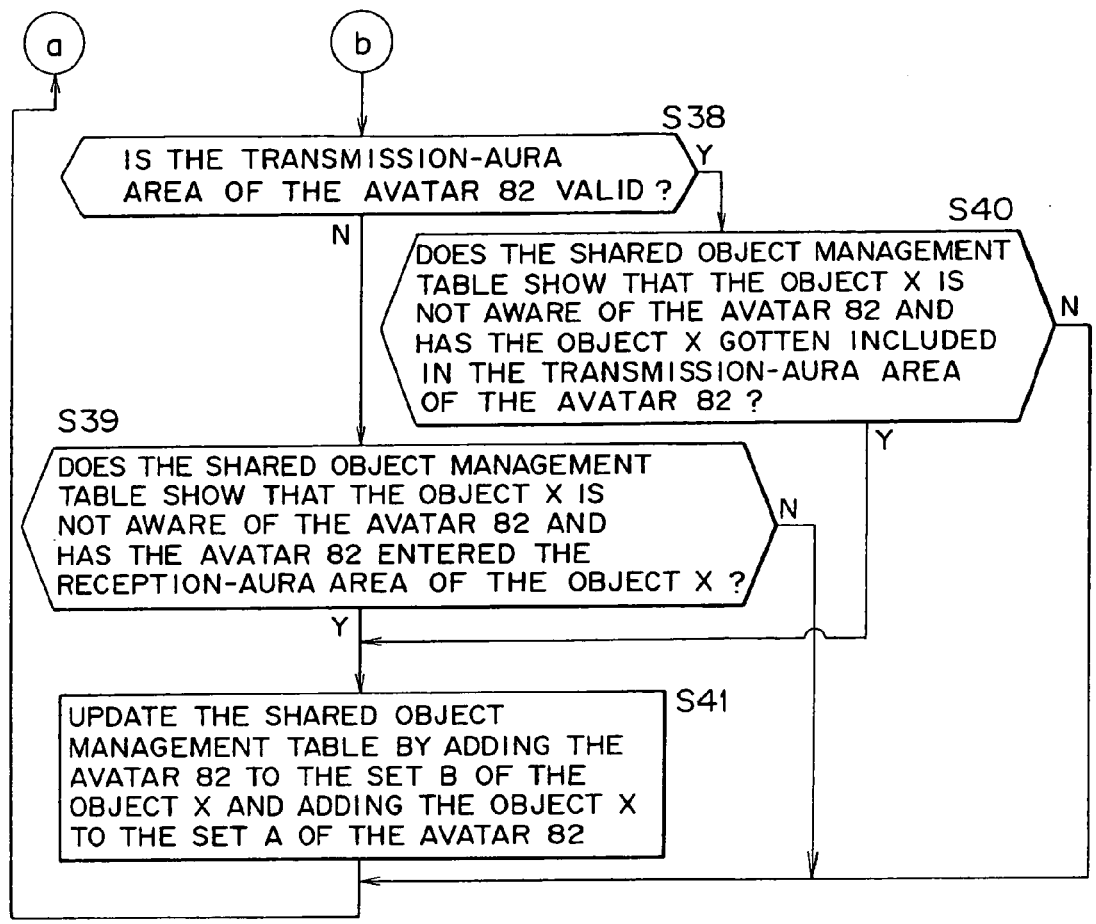
Figure 13:
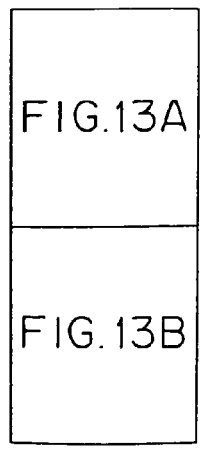

As shown in FIG. 13A, the flowchart begins with a step S31 in which the shared server 12 selects an object from those in the shared object management table as an object X. The flow of the processing then goes on to a step S32.

At the step S32, the shared server 12 forms a judgment as to whether or not all objects in the shared object management table have completed the subsequent processing. If all objects in the shared object management table have not yet completed the subsequent processing, the flow of the processing then goes on to a step S33.

At the step S33, the shared server 12 forms a judgment as to whether or not the object X is the avatar 82 itself. If the object X is the avatar 82 itself, the flow of the processing goes back to the step S31. If the object X is not the avatar 82 itself, on the other hand, the flow of the processing goes on to a step S34.

At the step S34, the shared server 12 forms a judgment as to whether the transmission-aura area of the object X is valid or invalid. If the outcome of the judgment formed at the step S34 indicates that the transmission-aura area of the object X is invalid, the flow of the processing goes on to a step S35.

At the step S35, the shared server 12 finds out if information in the shared object management table indicates that the avatar 82 is not aware of the object X and forms a judgment as to whether or not the object X is actually located in the reception-aura area of the avatar 82 after the movement of the avatar 82. If the information in the shared object management table shows that the avatar 82 is not aware of the object X but the outcome of the judgment formed at the step S35 indicates that the object X was included in the reception-aura area of the avatar 82 after the movement of the avatar 82, the flow of the processing goes on to a step S37.

At the step S37, the shared server 12 adds the object X to the set B of the avatar 82 and adds the avatar 82 to the set A of the object X in the shared object management tables since the object X is now included in the reception-aura area of the avatar 82 due to the movement of the avatar 82. The flow of the processing then goes on to a step S38.

If the information in the shared object management table shows that the avatar 82 is aware of the object X or the outcome of the judgment formed at the step S35 indicates that the object X is not included in the reception-aura area of the avatar 82 after the movement of the avatar 82, on the other hand, the flow of the processing goes on to the step S38, skipping the processing of the step S37 since updating is not required. The flow of the processing from the step S35 to the step S38 skipping the step S37 may represent a case in which the object X has been excluded from the reception-aura area of the avatar 82 due to the movement of the avatar 82.

If the outcome of the judgment formed at the step S34 indicates that the transmission-aura area of the object X is valid, on the other hand, the flow of the processing goes on to a step S36.

At the step S36, the shared server 12 finds out if information in the shared object management table indicates that the avatar 82 is not aware of the object X and forms a judgment as to whether or not the avatar 82 has entered the transmission-aura area of the object X after the movement of the avatar 82. If the information in the shared object management table shows that the avatar 82 is not aware of the object X, but the outcome of the judgment formed at the step S35 indicates that the avatar 82 has entered the transmission-aura area of the object X after the movement of the avatar 82, the flow of the processing goes on to the step S37 to update the shared object management table as described above. If the information in the shared object management table shows that the avatar 82 is aware of the object X or the outcome of the judgment formed at the step S36 indicates that the avatar 82 is not in the transmission-aura area of the object X after the movement of the avatar 82, on the other hand, the flow of the processing goes on to the step S38, skipping the processing of the step S37 since updating is not required. The flow of the processing from the step S36 to the step S38 skipping the step S37 may represent a case in which the avatar 82 has departed from the transmission-aura area of the object X due to the movement of the avatar 82.

At the step S38, the shared server 12 forms a judgment as to whether the transmission-aura area of the avatar 82 is valid or invalid. If the outcome of the judgment formed at the step S38 indicates that the transmission-aura area of the avatar 82 is invalid, the flow of the processing goes on to a step S39.

At the step S39, the shared server 12 finds out if information in the shared object management table indicates that the object X is not aware of the avatar 82 and forms a judgment as to whether or not the avatar 82 has actually entered the reception-aura area of the object X after the movement of the object X. If the information in the shared object management table shows that the object X is not aware of the avatar 82 but the outcome of the judgment formed at the step S35 indicates that the avatar 82 has entered the reception-aura area of the object X after the movement of the object X, the flow of the processing goes on to a step S41.

At the step S41, the shared server 12 adds the avatar 82 to the set B of the object X and adds the object X to the set A of the avatar 82 in the shared object management tables since the avatar 82 is now included in the reception-aura area of the object X due to the movement of the avatar 82. The flow of the processing then goes back to the step S31.

If the information in the shared object management table shows that the object X is aware of the avatar 82 or the outcome of the judgment formed at the step S39 indicates that the avatar 82 is not included in the reception-aura area of the object X after the movement of the avatar 82, on the other hand, the flow of the processing goes back to the step S31, skipping the processing of the step S41 since updating is not required. The flow of the processing from the step S39 back to the step S31 skipping the step S41 may represent a case in which the avatar 82 has departed from the reception-aura area of the object X due to the movement of the avatar 82.

If the outcome of the judgment formed at the step S38 indicates that the transmission-aura area of the avatar 82 is valid, on the other hand, the flow of the processing goes on to a step S40.

At the step S40, the shared server 12 finds out if information in the shared object management table indicates that the object X is not aware of the avatar 82 and forms a judgment as to whether or not the object X is actually located in the transmission-aura area of the avatar 82 after the movement of the avatar 82. If the information in the shared object management table shows that the object X is not aware of the avatar 82 but the outcome of the judgment formed at the step S40 indicates that the object X has entered the transmission-aura area of the avatar 82 after the movement of the avatar 82, the flow of the processing goes on to the step S41 to update the shared object management table as described above. If the information in the shared object management table shows that the object X is aware of the avatar 82 or the outcome of the judgment formed at the step S40 indicates that the object X is not in the transmission-aura area of the avatar 82 after the movement of the avatar 82, on the other hand, the flow of the processing goes back to the step S31, skipping the processing of the step S41 since updating is not required. The flow of the processing from the step S40 back to the step S31 skipping the step S41 may represent a case in which the object X has been excluded from the transmission-aura area of the avatar 82 due to the movement of the avatar 82.

The pieces of processing in the steps S31 to S41 are carried out repeatedly as long as the outcome of the judgment formed at the step S32 indicates that all the objects in the shared object management table have not yet completed the subsequent processing. When all objects in the shared object management table have completed the subsequent processing, the flow of the processing is terminated and goes back to the calling program.

It should be noted that a computer program to be executed for carrying out the various kinds of processing described above may be presented to the user in computer-readable form through presentation media such as a network, or information recording media such as a CD-R, a CD-ROM or a floppy disc. As an alternative, the program can be stored in an embedded RAM or a hard disc if necessary.

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. An information processing apparatus for management of information on objects placed in a 3-dimensional virtual space, said information processing apparatus comprising:
   a sensing-area setting means for setting a sensing area used for a sensing object to sense information on one or more sensed objects within said sensing area; and
   a transmission-area setting means for setting a transmission area used for a transmitting object to transmit information to one or more receiving objects within said transmission area, wherein at least one of said sensing object and transmitting object is associated with a server, and wherein one of said sensing area and said transmission area is wider than the other of said sensing area and said transmission area.

2. The information processing apparatus of claim 1, further comprising:
   interaction means for exchanging data between said sensing object and said one or more sensed objects based on said sensing area, and between said transmitting object and said one or more receiving objects based on said transmission area.

3. An information processing apparatus for management of information on objects placed in a 3-dimensional virtual space, said information processing apparatus comprising:
   a sensing-area setting means for setting a sensing area used for a sensing object to send information on one or more sensed objects within said sensing area; and
   a transmission-area setting means for setting a transmission area used for a transmitting object to transmit information to one or more receiving objects within said transmission area, wherein at least one of said sensing object and transmitting object is associated with a server, and wherein said transmitting object is said sensing object.

4. An information processing apparatus for management of information on objects placed in a 3-dimensional virtual space, said information processing apparatus comprising:
   a sensing-area setting means for setting a sensing area used for a sensing object to sense information on one or more sensed objects within said sensing area;
   a transmission-area setting means for setting a transmission area used for a transmitting object to transmit information to one or more receiving objects within said transmission area; and
   determination means for determining whether said one or more sensed objects are within said sensing area, and for determining whether said one or more receiving objects are within said transmission area, and wherein at least one of said sensing object and transmitting object is associated with a server.

5. An information processing method for management of information on objects placed in a 3-dimensional virtual space, said information processing method comprising the steps of:
   setting a sensing area used for a sensing object to sense information on one or more sensed objects within said sensing area; and
   setting a transmission area used for a transmitting object to transmit information to one or more receiving objects within said transmission area, wherein at least one of said sensing object and transmitting object is associated with a server, and wherein one of said sensing area and said transmission area is wider than the other of said sensing area and said transmission area.

6. The information processing method of claim 5, further comprising the step of:
   exchanging data between said sensing object and said one or more sensed objects based on said sensing area, and between said transmitting object and said one or more receiving objects are within based on said transmission area.

7. An information processing method for management of information on objects placed in a 3-dimensional virtual space, said information processing method comprising the steps of:
   setting a sensing area used for a sensing object to sense information on one or more sensed objects within said sensing area; and
   setting a transmission area used for a transmitting object to transmit information to one or more receiving objects within said transmission, wherein at least one of said sensing object and transmitting object is associated with a server, and wherein said transmitting object is said sensing object.

8. An information processing method for management of information on objects placed in a 3-dimensional virtual space, said information processing method comprising the steps of:
   setting a sensing area used for a sensing object to sense information on one or more sensed objects within said sensing area;
   setting a transmission area used for a transmitting object to transmit information to one or more receiving objects within said transmission area; and
   determining whether said one or more sensed objects are within said sensing area, and whether said one or more receiving objects are within said transmission area, and wherein at least one of said sensing object and transmitting object is associated with a server.

9. A computer-readable medium for presenting a program executable by a computer to operate an information processing apparatus for management of information on objects placed in a 3-dimensional virtual space, said program to carry out processing including the steps of:
   setting a sensing area used for a sensing object to sense information on one or more sensed objects within said sensing area; and
   setting a transmission area used for a transmitting object to transmit information to one or more receiving objects within said transmission area, wherein at least one of said sensing object and transmitting object is associated with a server, and wherein one of said sensing area and said transmission area is wider than the other of said sensing area and said transmission area.

10. The computer-readable medium of claim 9, wherein said program further comprises the step of:
    exchanging data between said sensing object and said one or more sensed objects based on said sensing area, and between said transmitting object and said one or more receiving objects based on said transmission area.

11. A computer-readable medium for presenting a program executable by a computer to operate an information processing apparatus for management of information on objects placed in a 3-dimensional virtual space, said program to carry out processing including the steps of:

setting a sensing area used for a sensing object to sense information on one or more sensed objects within said sensing area; and setting a transmission area used for a transmitting object to transmit information to one or more receiving objects within said transmission area, wherein at least one of said sensing object and transmitting object is associated with a server, and wherein said transmitting object is said sensing object.

12. A computer-readable medium for presenting a program executable by a computer to operate an information processing apparatus for management of information on objects placed in a 3-dimensional virtual space, said program to carry out processing including the steps of:

setting a sensing area used for a sensing object to sense information on one or more sensed objects within said sensing area;

setting a transmission area used for a transmitting object to transmit information to one or more receiving objects within said transmission area; and determining whether said one or more sensed objects are within said sensing area, and whether said one or more receiving objects are within said transmission area, and wherein at least one of said sensing object and transmitting object is associated with a server.

13. An information processing apparatus for management of information on objects placed in a 3-dimensional virtual space, said information processing apparatus comprising:

a storage element configured to store information related to a sensing object, information related to one or more sensed objects, information related to a sensing area, information related to a transmitting object, information related to one or more receiving objects, and information related to a transmission area, wherein said sensing area is used for said sensing object to sense said information related to said one or more sensed objects within said sensing area, wherein said transmission area is used for said transmitting object to transmit said information related to said transmitting object to said one or more receiving objects within said transmission area, and wherein at least one of said sensing object and transmitting object is associated with a server; and a processor, coupled to said storage element, said processor configured to selectively set said sensing area and said transmission area such that one of said sensing area and said transmission area is wider than the other of said sensing area and said transmission area.

14. An information processing apparatus for management of information on objects placed in a 3-dimensional virtual space, said information processing apparatus comprising:

a storage element configured to store information related to a sensing object, information related to one or more sensed objects, information related to a sensing area, information related to a transmitting object, information related to one or more receiving objects, and information related to a transmission area, wherein said sensing area is used for said sensing object to sense said information related to said one or more sensed objects within said sensing area, wherein said transmission area is used for said transmitting object to transmit said information related to said transmitting object to said one or more receiving objects within said transmission area, and wherein at least one of said sensing object and transmitting object is associated with a server; and a processor, coupled to said storage element, said processor configured to selectively set said sensing area and said transmission area, wherein said transmitting object is said sensing object.

15. The information processing apparatus of claim 13, wherein:

said processor is further configured to exchange data between said sensing object and said one or more sensed objects based on said sensing area, and between said transmitting object and said one or more receiving objects based on said transmission area.

16. An information processing apparatus for management of information on objects placed in a 3-dimensional virtual space, said information processing apparatus comprising:

a storage element configured to store information related to a sensing object, information related to one or more sensed objects, information related to a sensing area, information related to a transmitting object, information related to one or more receiving objects, and information related to a transmission area, wherein said sensing area is used for said sensing object to sense said information related to said one or more sensed objects within said sensing area, wherein said transmission area is used for said transmitting object to transmit said information related to said transmitting object to said one or more receiving objects within said transmission area, and wherein at least one of said sensing object and transmitting object is associated with a server; and a processor, coupled to said storage element, said processor configured to selectively set said sensing area and said transmission area, wherein said processor is further configured to determine whether said one or more sensed objects are within said sensing area, and to determine whether said one or more receiving objects are within said transmission area.

* * * * *